United States Patent Office 3,634,317
Patented Jan. 11, 1972

3,634,317
PREPARATION OF WHITE, STABILIZED PHENOL FORMALDEHYDE CONDENSATION RESINS
Rudolf Klemke, Sparta, N.J., assignor to Mohawk Industries Inc., Sparta, N.J.
No Drawing. Filed Sept. 19, 1969, Ser. No. 859,575
Int. Cl. C08g 5/06, 5/18, 51/58
U.S. Cl. 260—45.7 P                    1 Claim

ABSTRACT OF THE DISCLOSURE

A phenol-formaldehyde aryl phosphite condensation product which is snow white in the resol stages and below a pH of 6.5 and to a method of making the same.

---

This invention relates to colorless phenol-formaldehyde resins stabilized by the pre-addition of triaryl phosphites and to a method of preparing the same. More particularly, it relates to a phenol-formaldehyde condensation product which has a permanently white effect.

In the preparation of phenol-formaldehyde products, the final product has a variation of colors from light to dark in contrast to a milk white product of the present invention.

A primary object of the present invention is to provide a stable white phenolic-formaldehyde resin which does not darken when exposed to light.

In the prior art, U.S. Pat. No. 2,816,876, dated Dec. 17, 1957, issued to Monsanto, discloses the use of triaryl phosphites in producing light colored resins by the post addition of triphenyl phosphite to mixtures of phenol and formaldehyde in the presence of an alkaline catalyst.

It has been found that pre-addition of small amounts of triaryl phosphites is of advantage in view of color stabilization: the resols thus obtained are already colorless at pH values below 6.5, in contrast to Monsanto's brown yellow Resinox 595, and are completely white instead of grey or pink as in Resinox 595 when cured.

The purpose of the present invention is to provide colorless resols prior to cured phenolic resins by introducing a triaryl phosphite into the mixture of phenol, formaldehyde and some caustic, starting pH 8–8.5, before starting the condensation process.

The following reaction takes place continuously during the chain growth directly from the start of the condensation operation preventing any discoloration which is obvious according to the Monsanto patent. Apparently, in the prior art, the discoloration of phenol-formaldehyde resins is caused by ortho- and para-quinone methides forming during the process of condensation. According to model reactions, the first reaction product between the quinone methides, ortho- or para-, and a triaryl phosphite was considered to be a dipolar ion, which undergoes a rapid translocation of one of the organic groups leading to an ether of a quinol-methide phos-phonate:

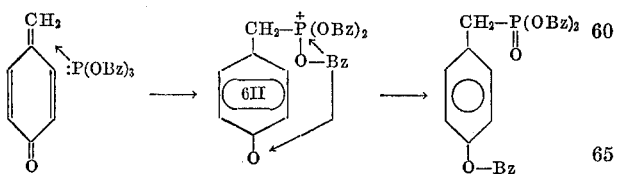

The following are illustrative examples of the preparation of white phenol condensation product.

EXAMPLE 1

5.0 gram (=0.016 mol) triphenyl phosphite, 95.0 gram (=1.0 mol) phenol, 100.0 gram (=1.33 mol) formaldehyde 40% and 2.5 ml. 40% NaOH are placed into a 500 ml. three necked round flask fitted with stirrer, dropping funnel, condenser and thermometer. The mixture is heated to reflux for 1.5 hours. At the end of this time, a white milky-like cloudiness appears which slowly increases. At this point, another 100.0 gram (=1.33 mol) of 40% formaldehyde is added through the dropping funnel and the reaction continued until the viscosity reaches about 200–250 cp. The pH is at this time between 5–6. After stripping at least 100 ml. of water by using a vacuum of 12 mm. Hg and an inner temperature of resultant mass reaches approximately 40° C., a completely colorless and clear resol is obtained.

This resol can be diluted with methanol or ethanol to a 45–50% solution in order to use it as a laminating resin instead of melamine resins. On curing at temperatures between 150–160° C. for 10–15 minutes, a snow white resin is obtained.

EXAMPLE 2

5.0 gram (=0.016 mol) triphenyl phosphite, 94.0 gram (=1.0 mol) phenol, 135 gram (=1.8 mol) formaldehyde 40% and 2.5 ml. NaOH are placed into a 500 ml. three necked round flask fitted with stirrer, thermometer and condenser are heated to reflux until a viscosity of 250–350 cp. is reached. This reaction takes about two hours. During this time, the pH drops to between 5–6. After stripping at least 75 ml. of water by using a vacuum of 12 mm. Hg and an inner temperature of approximately 40° C., a completely colorless resol is obtained. On curing as in Example 1, a snow white resin is obtained.

As examples of phenols that may be used in accordance with the present invention are phenol, cresols, xylols, alkyl phenols, such as p-tertiary butyl phenol, polyhydric phenols, such as resorcinol and catechal. These may be used individually or in mixtures thereof.

The formaldehyde used herein is of the standard type in solutions containing 37–42% HCHO.

The triaryl phosphites used may be selected from the following group: triphenyl phosphite, tricresyl phosphite, trixylyl phosphite, mono-phenyl dicresyl phosphite, diphenyl cresyl phosphite, etc.

If color is desired in the condensation, any suitable dye or filler may be added during preparation of the condensation product.

What is claimed is:

1. A process of preventing the development of any color during the condensation reaction and during the curing operation of a phenolic resin which comprises condensing phenol with formaldehyde under starting alkaline conditions to a liquid fusible state, having previously added thereto at the beginning of the reaction sufficient triaryl phosphite ranging between 0.2 to 5% by weight, ending with a snow white resol of a pH less than 6.5, and curing the resol to an insoluble infusible state of a completely white color.

References Cited
UNITED STATES PATENTS

| | | | |
|---|---|---|---|
| 2,816,876 | 12/1957 | Higashi | 260—45.7 |
| 3,297,631 | 1/1967 | Bown et al. | 260—45.95 |
| 3,367,996 | 2/1968 | Strauss et al. | 260—887 |
| 3,409,571 | 11/1968 | Shepard et al. | 260—17.2 |

DONALD E. CZAJA, Primary Examiner

R. A. WHITE, Assistant Examiner

U.S. Cl. X.R.

260—57 C